US012424186B2

(12) United States Patent
Lee

(10) Patent No.: US 12,424,186 B2
(45) Date of Patent: Sep. 23, 2025

(54) DISPLAY DEVICE

(71) Applicant: LG Display Co., Ltd., Seoul (KR)

(72) Inventor: Da-Hee Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 167 days.

(21) Appl. No.: 18/503,201

(22) Filed: Nov. 7, 2023

(65) Prior Publication Data

US 2024/0257784 A1 Aug. 1, 2024

(30) Foreign Application Priority Data

Jan. 27, 2023 (KR) ........................ 10-2023-0011087

(51) Int. Cl.
*G09G 3/36* (2006.01)
*G09G 3/32* (2016.01)

(52) U.S. Cl.
CPC ............. *G09G 3/3688* (2013.01); *G09G 3/32* (2013.01); *G09G 2310/0275* (2013.01); *G09G 2310/0297* (2013.01); *G09G 2310/08* (2013.01); *G09G 2320/0223* (2013.01); *G09G 2330/06* (2013.01)

(58) Field of Classification Search
CPC ................... G09G 3/3688; G09G 3/32; G09G 2310/0275; G09G 2310/0297; G09G 2310/08; G09G 2320/0223; G09G 2330/06; G09G 2310/027; G09G 3/20; G09G 2300/0408; G09G 2300/0426; G09G 2300/043; G09G 2310/0281; G09G 3/36; G09G 2310/0202; G09G 2310/0243; G09G 2310/0264; G02F 1/1333; G02F 1/133514; G02F 1/1337; G02F 1/1343; G02F 1/1362; G02F 1/136204; G02F 1/136286
See application file for complete search history.

(56) References Cited

U.S. PATENT DOCUMENTS 11,037,505 B2 6/2021 Shin
2020/0193914 A1 * 6/2020 Shin ..................... G09G 3/3688

FOREIGN PATENT DOCUMENTS

KR 10-2020-0072769 A 6/2020
KR 10-2021-0082824 A 7/2021

OTHER PUBLICATIONS

European Patent Office, Extended European Search Report, European Patent Application No. 23211129.4, Mar. 19, 2024, 13 pages.

* cited by examiner

*Primary Examiner* — Charles S Chang
(74) *Attorney, Agent, or Firm* — Fenwick & West LLP

(57) ABSTRACT

A display device includes: a multiplexer in a first region of a non-display region, and including K MUX transistors which are commonly connected to a data channel line and are connected to K data lines; a pseudo multiplexer disposed in a third region of the non-display region, and including K pseudo MUX transistors corresponding to the K MUX transistors; and K MUX control lines and K pseudo MUX control lines in a second region between the first and third regions, the K MUX control lines connected to the K MUX transistors, the K pseudo MUX control lines connected to the K pseudo MUX transistors, wherein the second region includes a first partial region adjacent to the first region and having the K MUX control lines thereon, and a second partial area adjacent to the third region and having the K pseudo MUX control lines thereon.

20 Claims, 5 Drawing Sheets

DISPLAY DEVICE

CROSS REFERENCE TO RELATED APPLICATIONS

The present application claims the priority benefit of Korean Patent Application No. 10-2023-0011087 filed in Republic of Korea on Jan. 27, 2023, which is hereby incorporated by reference in its entirety for all purposes as if fully set forth herein.

BACKGROUND

Field of the Invention

The present disclosure relates to a display device.

Discussion of the Related Art

As a resolution of display devices increases, a large number of signal lines are required, making wiring design complicated. To improve this, a multiplexer is used to connect a plurality of data lines to each channel of a data driving circuit portion.

The use of the multiplexer causes electro-magnetic interference (EMI), and to improve this, a pseudo multiplexer is used near the multiplexer.

The description provided in the background section should not be assumed to be prior art merely because it is mentioned in or associated with the background section. The background section may include information that describes one or more aspects of the subject technology.

SUMMARY

However, as recognized by the inventor of present disclosure, in the past, as a line that transmits a control signal of the pseudo-multiplexer overlaps a line that transmits a control signal of the multiplexer, parasitic capacitance occurs, which causes RC delay. Accordingly, a charging system defect in which the control signal of the multiplexer is not normally provided to the multiplexer occurs.

Accordingly, the present disclosure is directed to a display device that substantially obviates one or more of the problems due to limitations and disadvantages of the related art.

An advantage of the present disclosure is to provide a display device which can prevent (or reduce) occurrence of RC delay due to overlap between a line transmitting a control signal of a pseudo multiplexer and a line transmitting a control signal of a multiplexer.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a display panel including an array substrate in which a display region on which pixels and data lines connected to the pixels are arranged, and a non-display region around the display region are defined; a multiplexer which is disposed in a first region of the non-display region, and includes K (K is an integer of 2 or more) MUX transistors, wherein source electrodes of the K MUX transistors are commonly connected to a data channel line, and drain electrodes of the K MUX transistors are respectively connected to K data lines; a pseudo multiplexer which is disposed in a third region of the non-display region, and includes K pseudo MUX transistors that are disposed to correspond to the K MUX transistors, respectively; and K MUX control lines and K pseudo MUX control lines arranged in a second region between the first and third regions of the non-display region, wherein the K MUX control lines are respectively connected to gate electrodes of the K MUX transistors, and the K pseudo MUX control lines are respectively connected to gate electrodes of the K pseudo MUX transistors, wherein the second region includes a first partial region which is adjacent to the first region and in which the K MUX control lines are arranged, and a second partial area which is adjacent to the third region and in which the K pseudo MUX control lines are arranged.

In another aspect, a display device includes: a multiplexer which is in a display panel and is connected between data lines and one data channel line; a pseudo multiplexer which is in the display panel and is spaced apart from the multiplexer in a first direction; and MUX control lines and pseudo MUX control lines between the multiplexer and the pseudo multiplexer, the MUX control lines extending along a second direction crossing the first direction and connected to the multiplexer, the pseudo MUX control lines extending along the second direction and connected to the pseudo multiplexer, wherein the MUX control lines are disposed between the multiplexer and the pseudo MUX control lines.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

Figure 1:
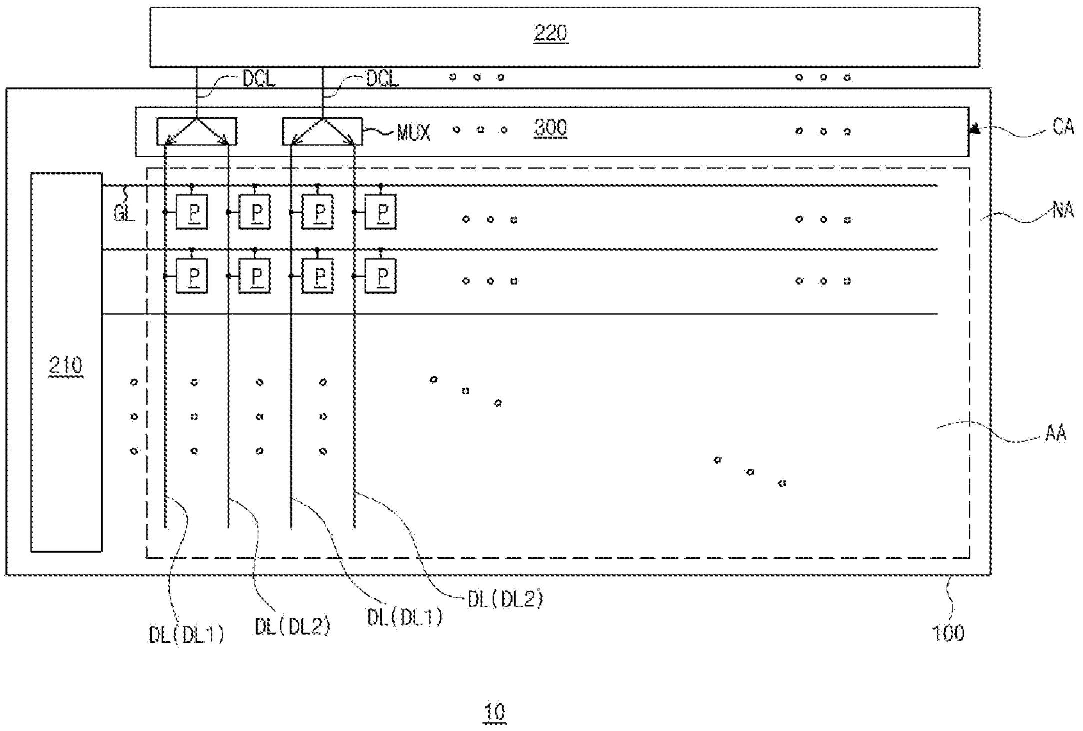
FIG. 1 is a view schematically illustrating a configuration of a display device according to an exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION OF THE ILLUSTRATED EMBODIMENTS

Reference will now be made in detail to embodiments of the present disclosure, examples of which may be illustrated in the accompanying drawings. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

Advantages and features of the present disclosure and methods of achieving them will be apparent with reference to the embodiments described below in detail with the accompanying drawings. However, the present disclosure is not limited to the embodiments disclosed below, but can be realized in a variety of different forms, and only these embodiments allow the present disclosure to be complete. The present disclosure is provided to fully inform the scope of the disclosure to the skilled in the art of the present disclosure, and the present disclosure can be defined by the scope of the claims.

The shapes, sizes, proportions, angles, numbers, and the like disclosed in the drawings for explaining the embodiments of the present disclosure are illustrative, and the present disclosure is not limited to the illustrated matters.

Furthermore, in describing the present disclosure, if it is determined that a detailed description of the related known technology unnecessarily obscure the subject matter of the present disclosure, the detailed description thereof can be omitted. When 'comprising', 'including', 'having', 'consisting', and the like are used in this disclosure, other parts can be added unless 'only' is used. When a component is expressed in the singular, cases including the plural are included unless specific statement is described.

Any implementation described herein as an "example" is not necessarily to be construed as preferred or advantageous over other implementations.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts can be positioned between such two parts unless 'right' or 'directly' is used.

In the case of a description of a temporal relationship, for example, when a temporal precedence is described as 'after', 'following', 'before', and the like, cases that are not continuous can be included unless 'directly' or 'immediately' is used.

The terms, such as "below," "lower," "above," "upper" and the like, may be used herein to describe a relationship between item(s) as illustrated in the drawings. It will be understood that the terms are spatially relative and based on the orientation depicted in the drawings.

In describing components of the present disclosure, terms such as first, second "A," "B," "(a)," and "(b)," and the like can be used. These terms are only for distinguishing the components from other components, and an essence, order, order, or number of the components is not limited by the terms. Further, when it is described that a component is "connected", "coupled" or "contact" to another component, the component can be directly connected or contact the another component, but it should be understood that other component can be "interposed" between the components.

The term "at least one" should be understood as including any and all combinations of one or more of the associated listed items. For example, the meaning of "at least one of a first element, a second element, and a third element" compasses the combination of all three listed elements, combinations of any two of the three elements, as well as each individual element, the first element, the second element, or the third element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Respective features of various embodiments of the present disclosure can be partially or wholly connected to or combined with each other and can be technically interlocked and driven variously, and respective embodiments can be independently implemented from each other or can be implemented together with a related relationship.

Hereinafter, embodiments of the present disclosure are described in detail with reference to the drawings. Meanwhile, in the following embodiments, the same and like reference numerals are assigned to the same and like components, and detailed descriptions thereof may be omitted.

Figure 2:
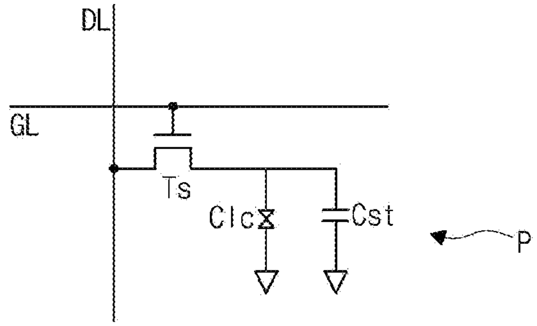
FIG. 2 is a circuit diagram showing a configuration of a pixel according to an exemplary embodiment of the present disclosure.

FIG. 1 is a view schematically illustrating a configuration of a display device according to an exemplary embodiment of the present disclosure, and FIG. 2 is a circuit diagram showing a configuration of a pixel according to an exemplary embodiment of the present disclosure.

Referring to FIGS. 1 and 2, the display device 10 according to an exemplary embodiment of the present disclosure may include a display panel 100 and a driving circuit portion that drives the display panel 100.

Here, the driving circuit portion may include, for example, a gate driving circuit portion 210, a data driving circuit portion 220, and a multiplexer circuit portion 300. Embodiments are not limited thereto. As an example, one or more components may be further included.

The display panel 100 may include a display region AA and a non-display region NA adjacent to or partially or fully surrounding the display area AA.

In the display area AA of the display panel 100, pixels P arranged along a plurality of horizontal lines (or row lines) and a plurality of vertical lines (or column lines) may be provided on a substrate. The term "horizontal" and "vertical" are based on the orientation as shown in FIG. 1, and may be variously changed depending on the practical orientation.

An image can be displayed on the display panel 100 through the plurality of pixels P.

Here, the plurality of pixels P may be pixels displaying different colors, for example, may include red, green, and blue pixels P that display red, green, and blue, respectively, but are not limited thereto. As an example, a white pixel displaying white may be further included. Pixels displaying colors other than red, green, blue and white may be also possible.

In the display panel 100, various signal lines that transmit driving signals for driving the pixels P may be formed on the substrate.

In this regard, for example, a plurality of data lines DL transmitting data signals (or data voltages), which are image signals, may extend along the vertical direction and be connected to the pixels P of the corresponding vertical lines. In addition, a plurality of gate lines GL transmitting gate signals (or gate voltages) may extend along the horizontal direction and be connected to the pixels P of the corresponding horizontal lines.

The pixels P may be defined by the plurality of data lines DL and gate lines GL that cross each other.

Referring to FIG. 2, each pixel P may be provided with a switching transistor Ts connected to the gate line and data line GL and DL, and a liquid crystal capacitor Clc. The liquid crystal capacitor Clc may be configured with a pixel electrode and a common electrode corresponding to each other, and a liquid crystal layer interposed between the pixel electrode and the common electrode.

In addition, the pixel P may further include a storage capacitor Cst to store the data signal input thereto.

Figure 3:
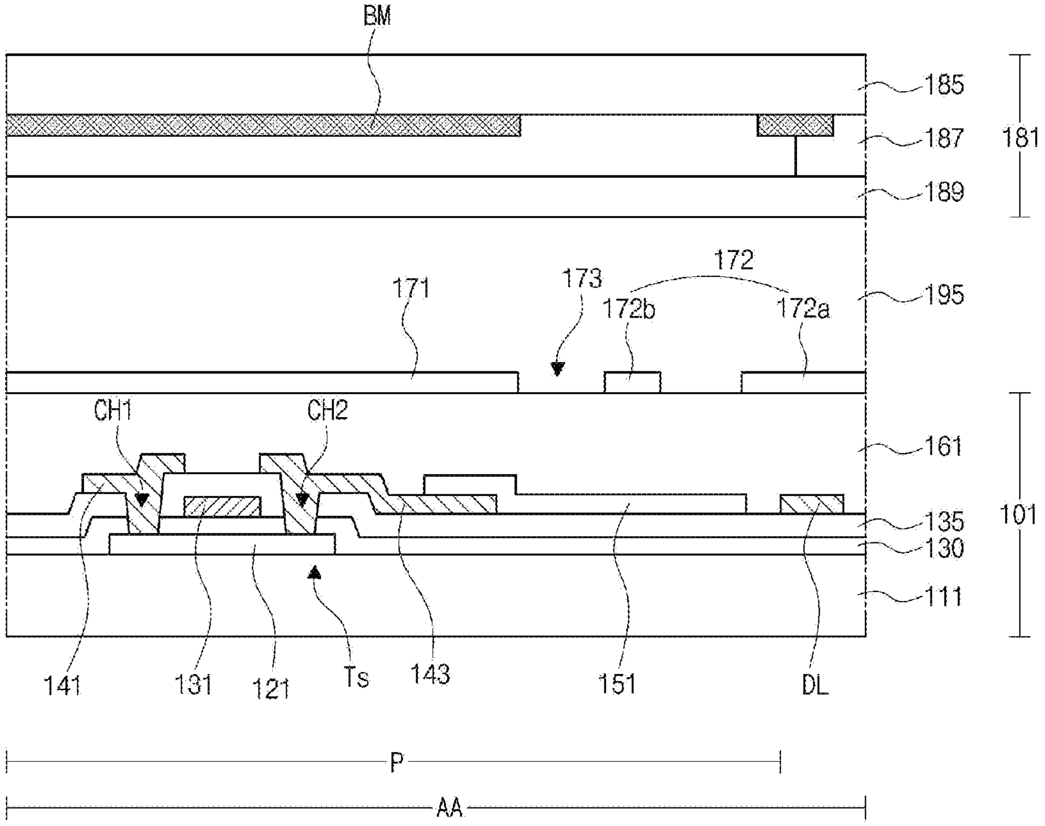
FIG. 3 is a cross-sectional view schematically illustrating an example of a display panel according to an exemplary embodiment of the present disclosure.

FIG. 3 can be referred to with regard to a structure of the display panel 100. FIG. 3 is a cross-sectional view schematically illustrating an example of a display panel according to an exemplary embodiment of the present disclosure.

Meanwhile, in FIG. 3, for convenience of explanation, the display panel 100 of an in-plane switching (IPS) type is shown as an example. However, the display panel 100 of this embodiment may be any type of display panel, including the IPS type, a vertical alignment (VA) type, or a twisted nematic (TN) type.

Referring to FIGS. 1 to 3, the display panel 100 may include an array substrate (or lower substrate) 101 and a counter substrate (or upper substrate) 181 facing each other, and a liquid crystal layer 195 interposed between the array substrate 101 and the counter substrate 181.

Meanwhile, although not specifically shown, a backlight unit providing light may be further provided. As an example, the backlight unit may be disposed below the array substrate 101, without being limited thereto.

In the array substrate 101, the plurality of gate lines GL extending along a first direction, for example, a horizontal direction (or row direction) may be formed on a first substrate 111.

A gate insulating layer 130, which is an insulating layer made of an insulating material, may be formed below the gate line GL. As an example, the gate insulating layer 130 may be composed of a single layer or multilayers of silicon oxide SiOx or silicon nitride SiNx, and may be formed by atomic layer deposition (ALD) method or metal organic chemical vapor deposition (MOCVD), but not limited thereto. In addition, an interlayered insulating layer 135, which is an insulating layer made of an insulating material, may be formed on the gate line GL.

On the interlayered insulating layer 135, the plurality of data lines DL may be formed extending along a second direction, for example, a vertical direction (or column direction).

In each pixel P, the switching transistor Ts connected to the gate line and data line GL and DL) may be formed.

The switching transistor Ts may have a gate electrode 131 connected to the gate line GL, a semiconductor layer 121 located below the gate insulating layer 130, and a source electrode 141 and a drain electrode 143 located on the interlayered insulating layer 135 and spaced apart from each other. Here, the source electrode 141 may be connected to the data line DL.

Here, the semiconductor layer 121 may include a channel region corresponding to the gate electrode 131, and a source region and a drain region on both sides of the channel region. For example, the semiconductor layer 121 may be formed of one selected from among oxide semiconductor material, amorphous silicon (Si) semiconductor material, or polycrystalline semiconductor material, but the present disclosure is not limited thereto.

The source electrode 141 and the drain electrode 143 may be connected to the source region and the drain region of the semiconductor layer 121 through respective contact holes CH1, CH2 formed in the interlayered insulating layer 135 and the gate insulating layer 130.

In each pixel P, a pixel electrode 151 connected to the drain electrode 143 of the switching transistor Ts may be formed. The pixel electrode 151 may be formed of a transparent conductive material such as ITO, IZO, or ITZO, but is not limited thereto.

Alternatively, the pixel electrode 151 may be formed to be disposed on the drain electrode 143 with at least one insulating layer interposed therebetween. In this case, a contact hole may be formed in the insulating layer formed between the pixel electrode 151 and the drain electrode 143, and the pixel electrode 151 may be configured to contact the drain electrode 143 through the contact hole.

A passivation layer 161, which is an insulating layer made of an insulating material, may be formed on the pixel electrode 151 and the switching transistor Ts. For example, the passivation layer 161, which is a kind of dielectric (e.g., an inorganic dielectric), may be constituted by a single layer made of a silicon oxide (SiOx) film, a silicon nitride (SiNx) film, or a silicon oxynitride (SiOxNy) film or a multilayer film thereof, etc.

A common electrode 171 facing the pixel electrode 151 may be formed on the passivation layer 161. The common electrode 171 may be formed of a transparent conductive material such as ITO, IZO, or ITZO, but is not limited thereto.

The common electrode 171, together with the pixel electrode 151, may drive the liquid crystal layer 195 by forming a fringe field which is an in-plane electric field (or horizontal electric field).

The common electrode 171 may include a plurality of bar-shaped electrode patterns 172 which correspond to each pixel P and face the pixel electrode 151, and an opening 173 may be formed between the electrode patterns 172 and between the electrode patterns 172 and the remaining portion of the common electrode 171.

Here, the plurality of electrode patterns 172 may be formed to extend along the extension direction of the data line DL. In addition, the plurality of electrode patterns 172 may include a first electrode pattern **172*a* which is close to the data line DL and located on the outermost side of the pixel P, and a second electrode pattern 172*b* located inside the first electrode pattern 172*a***.

Here, as an example, the first electrode pattern **172*a*** may have a greater width than that of the data line DL and may cover the data line DL therebelow, but is not limited thereto.

As an example, the first electrode pattern 172*a* may overlap at least a portion of the data line DL. As an example, the first electrode pattern 172*a* may also have a same width as that of the data line DL or even a smaller width than that of the data line DL.

When the first electrode pattern 172*a* is formed in this manner, electrical interference between the data line DL and the pixel electrode 151 can be reduced or prevented.

In addition, the second electrode pattern 172*b* located inside may be formed to have a smaller width than that of the first electrode pattern 172*a*, but is not limited thereto. As an example, the width of the second electrode pattern 172*b* may be also greater than or equal to that of the first electrode pattern 172*a*.

Meanwhile, as another example of an arrangement structure of the common electrode 171 and the pixel electrode 151, the common electrode 171 may be formed so that a portion of the common electrode 171 corresponding to the pixel electrode 151 has a plate shape, and a pixel electrode 151 may be formed on the common electrode 171 with an insulating layer therebetween and include a plurality of electrode patterns.

As yet another example, each of the common electrode 171 and the pixel electrode 151 may be formed to have electrode patterns, and in this case, the electrode pattern of the common electrode 171 and the electrode pattern of the pixel electrode 151 may be arranged alternately, and the common electrode 171 and the pixel electrode 151 may be located at the same layer or may be located with an insulating layer therebetween.

Meanwhile, although not specifically shown, as an example, the common electrode 171 may be configured to be used as a touch electrode. In this case, for example, the common electrode 171 may function as an electric field generating electrode that is applied with a common voltage and drives the liquid crystal during a display period, and function as a touch electrode that is applied with a touch driving signal during a touch detection period between the display periods. As such, the common electrode 171 may serve as an in-cell touch type touch electrode. Embodiments are not limited thereto, and the common electrode 171 may not function as a touch electrode.

Meanwhile, although not specifically shown, in the array substrate 100, an alignment layer (or first alignment layer) for aligning the liquid crystal molecules of the liquid crystal layer 195 may be formed on the common electrode 171.

In the counter substrate 181 located over the array substrate 101, a color filter pattern 187 may be formed on an inner surface of a second substrate 185. In this regard, for example, red, green, and blue color filter patterns 187 may be formed corresponding to the red, green, and blue pixels P. The color of the filter patterns 187 are not limited thereto, and may be variously changed depending on the color of the pixels.

Meanwhile, in the counter substrate 181, a black matrix BM may be formed along a boundary between neighboring pixels P. The black matrix BM may be arranged to cover at least a portion of non-display array elements formed on the array substrate 101, for example, elements such as the data line DL, the gate line GL, and the switching transistor Ts.

An opening may be formed in the black matrix BM corresponding to the pixel P, and the color filter pattern 187 corresponding to each pixel P may fill the opening of the black matrix BM and cover an edge of the black matrix BM.

An overcoat layer 189, which is an insulating layer made of an insulating material, may be formed on the color filter pattern 187. The overcoat layer 189 may flatten a surface of the second substrate 185 on which the color filter pattern 187 is formed.

Meanwhile, although not specifically shown, an alignment layer (or a second alignment layer) for aligning the liquid crystal molecules of the liquid crystal layer 195 may be formed on the overcoat layer 189.

Referring again to FIG. 1, the gate driving circuit portion 210 may generate gate signals and sequentially apply the gate signals to the gate lines GL. For example, the gate signals may be output sequentially in a vertical direction from top to bottom in the drawing. The sequence for outputting the gate signals is not limited thereto, and may be variously changed depending on the design.

As an example, the gate driving circuit portion 210 may be formed directly at the array substrate 101 of the display panel 100 in a GIP (gate-in panel) type. For example, the gate driving circuit portion 210 may be formed in processes of forming the array elements. Embodiments are not limited thereto. As an example, the gate driving circuit portion 210 may be formed in a separate process other than the processes of forming the array elements.

As another example, the gate driving circuit portion 210 may be configured with at least one gate IC. As an example, the gate driving circuit portion 210 may be connected to the display panel 100, for example, in a tape automated bonding (TAB) method, a chip on glass (COG) method, a chip on panel (COP) method, or a chip on film (COF) method, without being limited thereto.

The data driving circuit portion 220 may convert a digital data signal into a data voltage, which is an analog data signal, and output it to the display panel 100.

In this regard, the data driving circuit portion 220 may output data signals through each of a plurality of output channels (or output terminals), and to each output channel, M (M is an integer of 2 or more) (or multiple) data signals respectively applied to M data lines DL, which, for example, are adjacent to each other in the display panel 100, may be output during a horizontal period of each horizontal line.

Meanwhile, in this exemplary embodiment, for convenience of explanation, a case where two data signals applied to two adjacent data lines DL are output per output channel of the data driving circuit portion 220.

The data signal output may be applied to a corresponding data channel line (or data transmission line) DCL formed in or connected to the non-display region NA of the display panel 100. The data channel lines DCL may be connected to the respective output channels of the data driving circuit portion 220.

Meanwhile, the data driving circuit portion 220 may be configured with at least one data IC. In this case, as an example, the data IC of the data driving portion 220 may be connected to the non-display region NA on a corresponding one side of the display panel 100 (or array substrate 101), or may be mounted directly on the non-display region NA. As an example, the data IC of the data driving portion 220 may be mounted on a flexible circuit film and connected to the non-display region NA on a corresponding one side of the display panel 100 (or array substrate 101).

The multiplexer circuit portion 300 may be formed in the non-display region NA of the array substrate 101 of the display panel 100. The multiplexer circuit portion 300 may be formed together in the processes of forming the array elements of the array substrate 101, without being limited thereto. As an example, the multiplexer circuit portion 300 may also be formed in a separate process other than the processes of forming the array elements of the array substrate 101.

The multiplexer circuit portion 300 may include a plurality of multiplexers MUX. Each of the plurality of multiplexers MUX may have its input terminal connected to corresponding one of the plurality of data channel lines DCL, so that each multiplexer MUX may receive the data signal output from the corresponding output channel of the data driving circuit portion 220.

In addition, each multiplexer MUX may have its output terminals connected to two data lines DL, for example, the first data line DL1 and the second data line DL2.

Accordingly, the multiplexer MUX may alternately output two data signals input thereto to the first and second data lines DL1 and DL2 through its switching operation.

As such, the multiplexer MUX may perform the switching operation to alternately connect the corresponding output channel of the data driving circuit portion 220 to the neighboring first and second data lines DL1 and DL2. Accordingly, the multiplexer MUX may sequentially apply the first and second data signals, which are the two data signals output from the output channel of the data driving circuit portion 220, to the corresponding first and second data lines DL1 and DL2.

By using the multiplexer MUX as above, a number of the output channels of the data driving circuit portion 220 can be reduced, and a number of pad electrodes and transmission lines in the display panel 100 that receive data signals can be reduced.

Furthermore, the multiplexer circuit portion 300 may be provided with a pseudo multiplexer having substantially the same structure as the multiplexer MUX. The pseudo multiplexer can serve to reduce EMI generated according to the switching operation of the multiplexer MUX, and may use a control signal with a waveform (or phase) opposite to that of the control signal for switching the multiplexer MUX.

In this exemplary embodiment, a control line transmitting the control signal of the pseudo multiplexer may be configured so as not to overlap with a control line transmitting the control signal of the multiplexer MUX. Accordingly, a parasitic capacitance between the control line of the multiplexer MUX and the control line of the pseudo multiplexer can be reduced or minimized (or prevented). Thus, a RC delay of the control signal of the multiplexer MUX due to the parasitic capacitance can be improved, and as a result, the control signal of the multiplexer MUX is transmitted normally and a charging system defect of the multiplexer MUX can be improved.

The arrangement structure of the pseudo multiplexer and the multiplexer MUX is described in more detail below.

Figure 4:
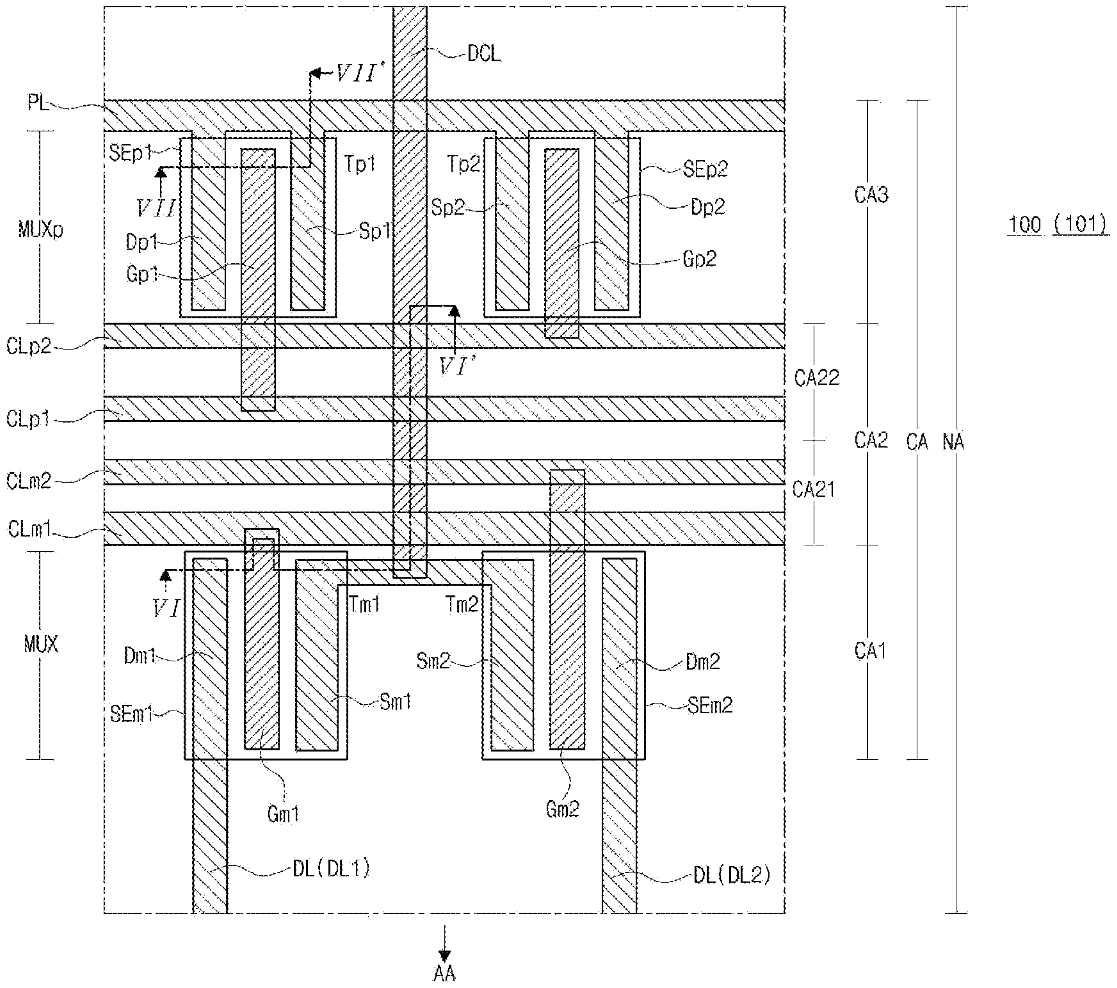
FIG. 4 is a plan view schematically illustrating a part of a multiplexer circuit portion according to an exemplary embodiment of the present disclosure.
Figure 5:
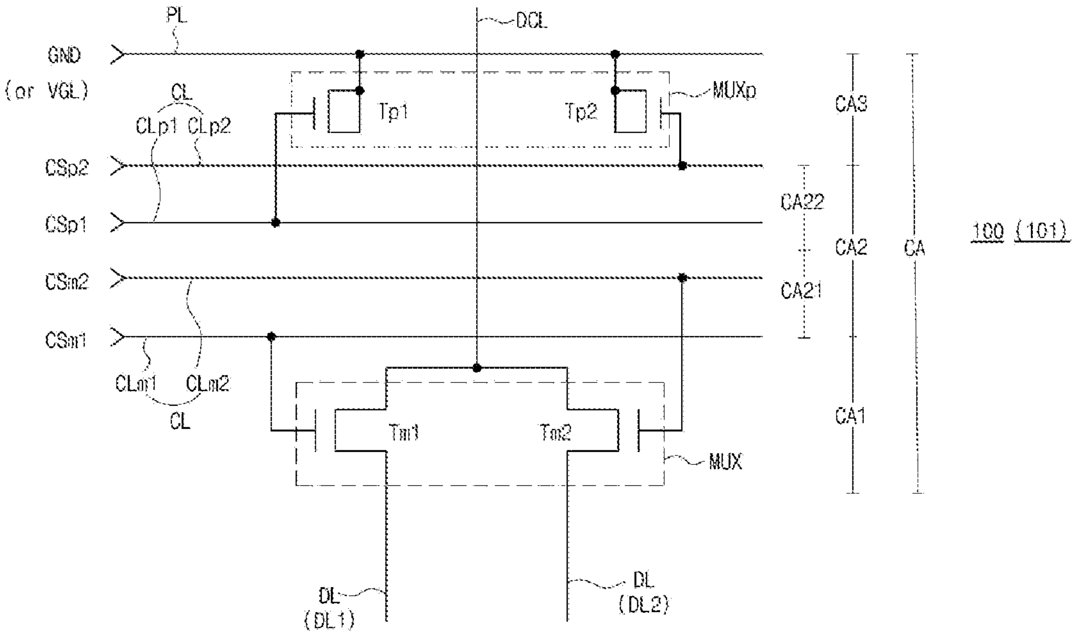
FIG. 5 is a circuit diagram illustrating a circuit configuration of a multiplexer circuit portion according to an exemplary embodiment of the present disclosure.
Figure 6:
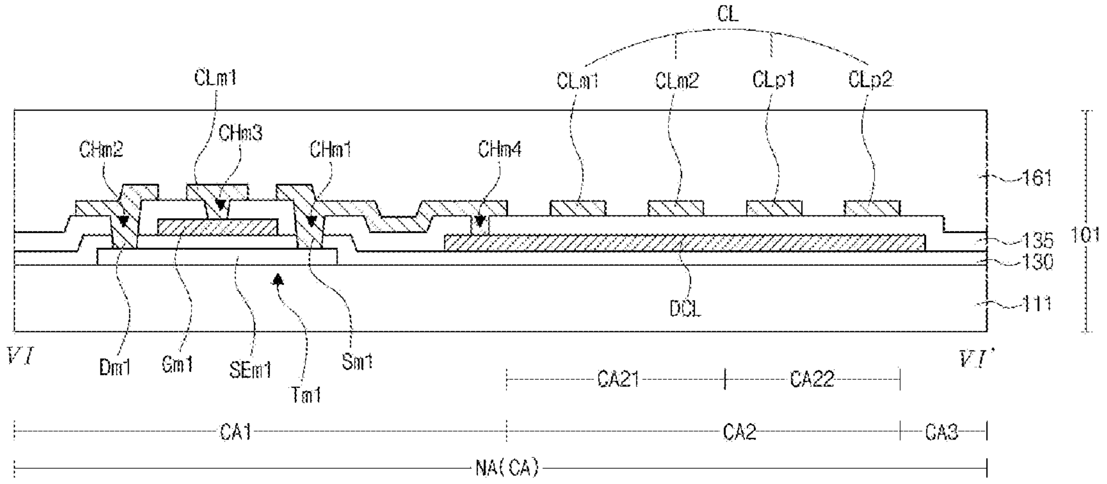
FIG. 6 is a cross-sectional view taken along a line VI-VI' of FIG. 4.
Figure 7:
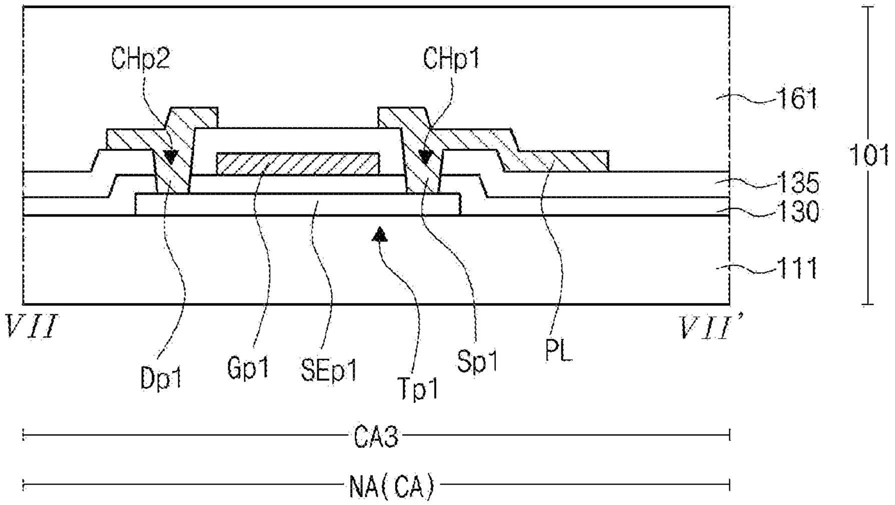
FIG. 7 is a cross-sectional view taken along a line VII-VII' of FIG. 4.

FIG. 4 is a plan view schematically illustrating a part of a multiplexer circuit portion according to an exemplary embodiment of the present disclosure. FIG. 5 is a circuit diagram illustrating a circuit configuration of a multiplexer circuit portion according to an exemplary embodiment of the present disclosure. FIG. 6 is a cross-sectional view, taken along a line VI-VI' of FIG. 4, illustrating a structure of a first MUX transistor of a multiplexer. FIG. 7 is a cross-sectional view, taken along a line VII-VII' of FIG. 4, illustrating a structure of a first pseudo MUX transistor of a pseudo multiplexer.

Referring to FIGS. 4 to 7 along with FIG. 1, in the multiplexer circuit portion 300 (or a region where the multiplexer circuit portion 300 is formed) according to this exemplary embodiment, a plurality of multiplexers MUX and a plurality of pseudo multiplexers MUXp, a plurality of control lines CL and a voltage line PL may be arranged.

Here, for convenience of explanation, in the non-display region NA of the display panel 100, a region where the multiplexer circuit portion 300 is formed may be referred to as a circuit region CA, and the circuit region CA may include first, second, and third regions CA1, CA2, and CA3, which are distinct from (or do not overlap) each other, defined therein. At this time, the first region CA1 may be a region close to the display area AA of the display panel 100, and the third region CA3 may a region close to one end of the display panel 100 (or the data driving portion 220), and the second region CA2 may be located between the first and third regions CA1 and CA3.

The plurality of multiplexers MUX may be arranged, for example, in the first region CA1 of the circuit region CA.

Each of the plurality of multiplexers MUX may include first and second MUX transistors Tm1 and Tm2 which are two switching elements respectively corresponding to and connected to the first and second data lines DL1 and DL2 that respectively receive the first and second data signals from each multiplexer MUX. The first and second MUX transistors Tm1 and Tm2 may be connected in common to the data channel line DCL that transmits the first and second data signals.

A drain electrode Dm1, which is an output terminal (or output electrode) of the first MUX transistor Tm1, may be connected to the corresponding first data line DL1, and a source electrode Sm1, which is an input terminal (or input electrode) of the first MUX transistor Tm1, may be connected to the data channel line DCL. In addition, a gate electrode Gm1, which is a control terminal (or control electrode) of the first MUX transistor Tm1, may be connected to a first MUX control line CLm1.

Accordingly, the first MUX transistor Tm1 may be switched on/off by a first MUX control signal CSm1 applied to the first MUX control line CLm1, and in the turn-on state of the first MUX transistor Tm1, the corresponding first data signal may be output to the first data line DL1.

Referring to FIG. 6 in relation to a stacked structure of the first MUX transistor Tm1, the first MUX transistor Tm1 may have a structure similar to the switching transistor (Ts of FIG. 3) in the pixel (P of FIG. 3) as described above, without being limited thereto.

In this regard, a semiconductor layer SEm1 may be formed on the first substrate 111 of the array substrate 101. The gate electrode Gm1 may be formed on the gate insulating layer 130 on the semiconductor layer SEm1. The source electrode Sm1 and the drain electrode Dm1 may be formed on the interlayered insulating layer 135 on the gate electrode Gm1.

Each of the source electrode Sm1 and the drain electrode Dm1 may contact the semiconductor layer SEm1 through respective contact holes CHm1 and CHm2 formed in the gate insulating layer 130 and the interlayered insulating layer 135.

Meanwhile, the gate electrode Gm1 may be connected to the first MUX control line CLm1 through a contact hole CHm3 formed in the interlayered insulating layer 135.

In addition, as an example, the source electrode Sm1 may be connected to the data channel line DCL. As an example, the source electrode Sm1 may be directly connected to the data channel line DCL on the same layer. As an example, the source electrode Sm1 may be connected to the data channel line DCL through a contact hole CHm4 formed in an insulating layer (e.g., the interlayered insulating layer 135) therebetween.

The drain electrode Dm2, which is an output terminal (or output electrode) of the second MUX transistor Tm2, may connected to the corresponding second data line DL2, and the source electrode Sm2, which is an input terminal (or input electrode) of the second MUX transistor Tm2, may be connected to the data channel line DCL. In addition, the gate electrode Gm2, which is a control terminal (or control electrode) of the second MUX transistor Tm2, may be connected to a second MUX control line CLm2.

Accordingly, the second MUX transistor Tm2 may be switched on/off by a second MUX control signal CSm2 applied to the second MUX control line CLm2, and in the turn-on state of the second MUX transistor Tm2, the corresponding second data signal may be output to the second data line DL2.

A stacked structure of the second MUX transistor Tm2 may be substantially the same as the stacked structure of the first MUX transistor Tm1 described above, without being limited thereto.

The plurality of pseudo multiplexers MUXp may be arranged, for example, in the third region CA3 of the circuit region CA.

Within the multiplexer circuit portion 300, the pseudo multiplexers MUXp may be provided in the same number as the multiplexers MUX, without being limited thereto.

The pseudo-multiplexer MUXp may be arranged in a one-to-one correspondence with the multiplexer MUX, without being limited thereto. For example, the pseudo multiplexer MUXp and the multiplexer MUX may be arranged to substantially face each other with the second region CA2 therebetween.

The pseudo multiplexer MUXp may be a component that is substantially unrelated to input and output of data signal. For example, the pseudo multiplexer MUXp may be structurally and electrically similar or identical to the multiplexer MUX, and its switching operation may be opposite to that of the multiplexer MUX.

The pseudo multiplexer MUXp may have its input terminal and output terminal electrically short-circuited to each other, and its input terminal and output terminal may be configured to commonly receive a DC voltage of, for example, 0V or less, or a voltage less than the smallest data signal, instead of a data signal. In this exemplary embodiment, for convenience of explanation, a case where a ground voltage GND is applied is taken as an example. As another example, the input terminal and output terminal of the pseudo multiplexer MUXp may receive a voltage of less than 0V (e.g., the gate low voltage VGL).

The pseudo multiplexer MUXp may include first and second pseudo MUX transistors Tp1 and Tp2 which are two switching elements positioned to correspond to the first and second MUX transistors Tm1 and Tm2, respectively. The first and second pseudo MUX transistors Tp1 and Tp2 may be commonly connected to the voltage line PL that transmits, for example, the ground voltage GND.

A source electrode Sp1 and a drain electrode Dp1, which are input terminal (or input electrode) and output terminal (or output electrode) of the first pseudo MUX transistor Tp1, respectively, may be short-circuited and commonly connected to the voltage line PL. In addition, a gate electrode Gp1, which is a control terminal (or control electrode) of the first pseudo MUX transistor Tp1, may be connected to a first pseudo MUX control line CLp1.

Accordingly, the first pseudo MUX transistor Tp1 may be switched on/off by a first pseudo MUX control signal CSp1 applied to the first pseudo MUX control line CLp1. Meanwhile, since the source electrode Sp1 and the drain electrode Dp1 of the first pseudo MUX transistor Tp1 are short-circuited to each other, there is substantially no signal input/output change due to an on/off state change of the first pseudo MUX transistor Tp1.

Here, the first pseudo MUX control signal CSp1 has a waveform (or phase) opposite to that of the first MUX control signal CSm1, so that the on/off of the first pseudo MUX transistor Tp1 may be opposite to the on/off of the corresponding first MUX transistor Tm1. In other words, when the first pseudo MUX transistor Tp1 is in the turn-on/turn-off state, on the contrary, the first MUX transistor Tm1 is in the turn-off/turn-on state.

Referring to FIG. 7 in relation to a stacked structure of the first pseudo MUX transistor Tp1, the first pseudo MUX transistor Tp1 may be formed in a structure similar to the above-described first MUX transistor Tm1, without being limited thereto.

In this regard, a semiconductor layer SEp1 may be formed on the first substrate 111 of the array substrate 101. The gate electrode Gp1 may be formed on the gate insulating layer 130 on the semiconductor layer SEp1. The source electrode Sp1 and the drain electrode Dp1 may be formed on the interlayered insulating layer 135 on the gate electrode Gp1.

The source electrode Sp1 and the drain electrode Dp1 may contact the semiconductor layer SEp1 through respective contact holes CHp1 and CHp2 formed in the gate insulating layer 130 and the interlayered insulating film 135.

Meanwhile, although not specifically shown, the gate electrode Gp1 may be connected to the first pseudo MUX control line CLp1, for example, directly or through a contact hole formed in an insulating layer therebetween (e.g., the interlayered insulating layer 135).

The source electrode Sp1 and the drain electrode Dp1 may be formed of the same material on the same layer as the voltage line PL, and may be branched and extended from the voltage line PL, as shown in FIG. 4, without being limited thereto. As an example, the source electrode Sp1 and the drain electrode Dp1 may be formed of a different material and/or on a different layer from the voltage line PL.

A source electrode Sp2 and a drain electrode Dp2, which are input terminal (or input electrode) and output terminal (or output electrode) of the second pseudo MUX transistor Tp2, respectively, may be short-circuited and commonly connected to the voltage line PL. In addition, a gate electrode Gp2, which is a control terminal (or control electrode) of the second pseudo MUX transistor Tp2, may be connected to a second pseudo MUX control line CLp2.

Accordingly, the second pseudo MUX transistor Tp2 may be switched on/off by a second pseudo MUX control signal CSp2 applied to the second pseudo MUX control line CLp2. Meanwhile, since the source electrode Sp2 and the drain electrode Dp2 of the second pseudo MUX transistor Tp2 are short-circuited to each other, there is substantially no electrical change or action due to an on/off state change of the second pseudo MUX transistor Tp2.

Here, the second pseudo MUX control signal CSp2 has a waveform (or phase) opposite to that of the second MUX control signal CSm2, so that the on/off of the second pseudo MUX transistor Tm2 may be opposite to the on/off of the corresponding second MUX transistor Tp2. In other words, when the second pseudo MUX transistor Tp2 is in the turn-on/turn-off state, on the contrary, the second MUX transistor Tm2 is in the turn-off/turn-on state.

A stacked structure of the second pseudo MUX transistor Tp2 may be substantially the same as the stacked structure of the first pseudo MUX transistor Tp1 described above, without being limited thereto.

The plurality of control lines CL may be arranged, for example, in the second region CA2 of the circuit region CA.

The plurality of control lines CL arranged in the second region CA2 may include the first and second MUX control lines CLm1 and CLm2 that transmit the first and second MUX control signals CSm1 and CSm2, respectively, and the first and second pseudo MUX control lines CLp1 and CLp2 that transmit the first and second pseudo MUX control signals CSp1 and CSp2, respectively.

The plurality of control lines CL may be formed, for example, to extend in the horizontal direction (or first direction) in the drawing.

Meanwhile, in this exemplary embodiment, the case where the voltage line PL is disposed in the third region CA3 is taken as an example. However, the voltage line PL may be disposed in the second region CA2.

As shown in FIGS. 4 and 6, the plurality of control lines CL may be formed of the same material as and at the same layer as the source electrodes Sm1, Sm2, Sp1 and Sp2 and the drain electrode Dm1, Dm2, Dp1 and Dp2 of the first and second MUX transistors Tm1 and Tm2 and the first and second pseudo MUX transistors Tp1 and Tp2. Embodiments are not limited thereto.

Here, the second region CA2, where the plurality of control lines CL are arranged, may be divided into a first partial region CA21 and a second partial region CA22 that are distinct from each other (or do not overlap each other). The first partial region CA21 may be a region adjacent to the first region CA1, and the second partial region CA22 may be a region adjacent to the third region CA3.

In this case, the first and second MUX control lines CLm1 and CLm2 may be disposed in the first partial region CA21. In addition, the first and second pseudo MUX control lines CLp1 and CLp2 may be disposed in the second partial region CA22.

As such, in this exemplary embodiment, the first and second MUX control lines CLm1 and CLm2 connected to the multiplexer MUX may be disposed in the first partial region CA21 adjacent to the first region CA1 where the multiplexer MUX is disposed, and the first and second pseudo MUX control lines CLp1 and CLp2 connected to the pseudo multiplexer MUXp may be disposed in the second partial region CA22 adjacent to the third area CA3 where the pseudo multiplexer MUXp is disposed.

Accordingly, a signal transmission path of the MUX control lines CLm1 and CLm2 connected to the multiplexer MUX may not overlap with a signal transmission path of the pseudo MUX control lines CLp1 and CLp2 connected to the pseudo multiplexer MUXp. Thus, a parasitic capacitance between the MUX control lines CLm1 and CLm2 and the pseudo MUX control lines CLp1 and CLp2 can be reduced or minimized (or prevented).

In this regard, the gate electrode Gm1 of the first MUX transistor Tm1 connected to the first MUX control line CLm1 may have a shape extending, for example, in a second direction toward the first region CA1 (i.e., downward direction in FIG. 4) that is the vertical direction perpendicular to the first direction which is the horizontal direction. In other words, the gate electrode Gm1 of the first MUX transistor Tm1 may extend in the second direction while contacting the first MUX control line CLm1 through the corresponding contact hole CHm3.

In addition, the gate electrode Gm2 of the second MUX transistor Tm2 connected to the second MUX control line CLm2 may have a shape extending in the second direction that is the direction toward the first region CA1 (i.e., downward direction in FIG. 4). In other words, the gate electrode Gm2 of the second MUX transistor Tm2 may extend in the second direction while contacting the second MUX control line CLm2 through the corresponding contact hole.

On the other hand, the gate electrode Gp1 of the first pseudo MUX transistor Tp1 connected to the first pseudo MUX control line CLp1 may have a shape extending, for example, into the third region CA2 in the vertical direction perpendicular to the first direction which is the horizontal direction. In other words, the gate electrode Gp1 of the first pseudo MUX transistor Tp1 may extend in a third direction opposite to the second direction while contacting the first pseudo MUX control line CLp1 through a corresponding contact hole. Accordingly, the gate electrode Gp1 of the first pseudo MUX transistor Tp1 may be spaced apart from the first and second MUX control lines CLm1 and CLm2 without overlapping the first and second MUX control lines CLm1 and CLm2, thereby reducing or minimizing the parasitic capacitance.

The gate electrode Gp2 of the second pseudo MUX transistor Tp2 connected to the second pseudo MUX control line CLp2 may have a shape extending into the third region CA1. In other words, the gate electrode Gp2 of the second pseudo MUX transistor Tp2 may extend in the third direction opposite to the second direction while contacting the second pseudo MUX control line CLp2 through a corresponding contact hole. Accordingly, the gate electrode Gp2 of the second pseudo MUX transistor Tp2 may be spaced apart from the first and second MUX control lines CLm1 and CLm2 without overlapping the first and second MUX control lines CLm1 and CLm2, thereby reducing or minimizing the parasitic capacitance.

As above, in the exemplary embodiment of the present disclosure, the multiplexer MUX and the pseudo multiplexer MUXp can be located on opposite sides with the region, where the MUX control lines CLm1 and CLm2 and the pseudo MUX control lines CLp1 and CLp2 are disposed, therebetween, and at this time, the MUX control lines CLm1 and CLm2 can be placed near the multiplexer MUX, and the pseudo MUX control lines CLm1 and CLm2 can be placed near the pseudo multiplexer MUXp.

Accordingly, the signal transmission path of the MUX control lines CLm1 and CLm2 connected to the multiplexer MUX and the signal transmission path of the pseudo MUX control lines CLp1 and CLp2 connected to the pseudo multiplexer MUXp does not overlap each other. Thus, the parasitic capacitance between the MUX control lines CLm1 and CLm2 and the pseudo MUX control lines CLp1 and CLp2 can be reduced or minimized (or prevented).

Therefore, the RC delay of the control signal of the multiplexer MUX due to the parasitic capacitance can be relieved, and as a result, the control signal of the multiplexer MUX can be transmitted normally, so that the charging system defect of the multiplexer MUX can be improved.

Figure 8:
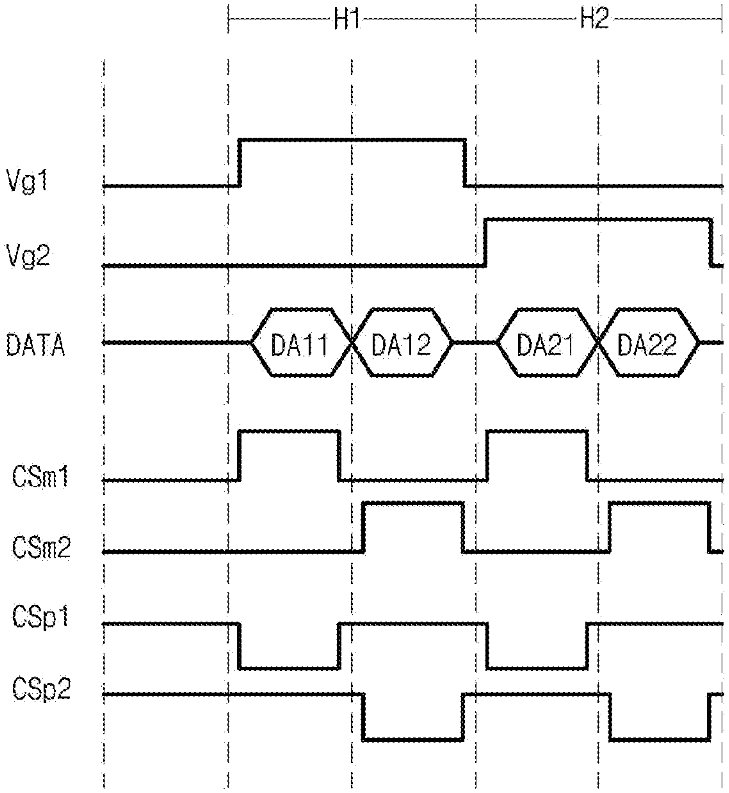
FIG. 8 is a timing diagram of signals driving a multiplexer and a pseudo multiplexer according to an embodiment of the present disclosure.

Hereinafter, operations of the multiplexer MUX and the pseudo multiplexer MUXp of this exemplary embodiment are described with further reference to FIG. 8. FIG. 8 is a timing diagram of signals driving a multiplexer and a pseudo multiplexer according to an exemplary embodiment of the present disclosure.

Meanwhile, in FIG. 8, for convenience of explanation, a case of driving first and second horizontal lines of the display panel (100 of FIG. 1) is taken as an example.

Referring to FIG. 8 along with FIGS. 1, 2, 4 and 5, in a first horizontal period H1 when a gate signal Vg1 is applied to the gate line GL of the corresponding first horizontal line, the first MUX control signal CSm1 and the second MUX control signal CSm2 may have turn-on voltages (e.g., high voltages) in order, and accordingly, the first MUX transistor Tm1 and the second MUX transistor Tm2 may be turned on in order. Although the turn-on voltages are illustrated as high voltages in FIG. 8, the embodiments are not limited thereto. The turn-on voltages could be high voltages or low voltages depending the type of the transistor.

Here, during a section when the first MUX transistor Tm1 is turned on, a first data signal DA11 transmitted to the multiplexer MUX may be output to the corresponding first data line DL1 through the first MUX transistor Tm1 and be transmitted to the pixel P of the first horizontal line connected to the first data line DL1.

Thereafter, during a section when the second MUX transistor Tm2 is turned on, a second data signal DA12 transmitted to the multiplexer MUX may be output to the corresponding second data line DL2 through the second MUX transistor Tm2 and be transmitted to the pixel P of the first horizontal line connected to the second data line DL2.

Next, in a second horizontal period H2 when a gate signal Vg2 is applied to the gate line GL of the corresponding second horizontal line, the first MUX control signal CSm1 and the second MUX control signal CSm2 may have turn-on voltages in order, and accordingly, the first MUX transistor Tm1 and the second MUX transistor Tm2 may be turned on in order.

Here, during a section when the first MUX transistor Tm1 is turned on, a first data signal DA21 transmitted to the multiplexer MUX may be output to the corresponding first data line DL1 through the first MUX transistor Tm1 and be transmitted to the pixel P of the second horizontal line connected to the first data line DL1.

Thereafter, during a section when the second MUX transistor Tm2 is turned on, a second data signal DA22 transmitted to the multiplexer MUX may be output to the corresponding second data line DL2 through the second MUX transistor Tm2 and be transmitted to the pixel P of the second horizontal line connected to the second data line DL2.

Meanwhile, the pseudo multiplexer MUXp may operate opposite to the operation of the multiplexer MUX described above.

In this regard, the first pseudo MUX control signal CSp1 may have a phase opposite to that of the corresponding first MUX control signal CSm1, and the second pseudo MUX control signal CSp2 may have a phase opposite to that of the corresponding second MUX control signal CSm2.

Accordingly, in each of the first and second horizontal periods H1 and H2, the first pseudo MUX transistor Tp1 may alternate between turn-off and turn-on in a way opposite to the corresponding first MUX transistor Tm1.

In addition, in the first and second horizontal periods H1 and H2, the second pseudo MUX transistor Tp2 may alternate between turn-off and turn-on in a way opposite to the second MUX transistor Tm2.

As such, as the multiplexer MUX and the pseudo-multiplexer MUXp perform the opposite switching operations, EMI due to the switching operation of the multiplexer MUX can be canceled by the opposing switching operation of the pseudo-multiplexer MUXp. As a result, even if the multiplexer MUX is used, EMI due to this can be reduced.

Meanwhile, in the above-described embodiment of the present disclosure, the case where the multiplexer and the pseudo-multiplexer have the same number of transistors and the MUX control lines and the pseudo MUX control lines are arranged in the same number is described as an example, but this embodiment is not limited thereto. For example, a number of the MUX transistors included in the multiplexer and a number of the pseudo MUX transistors included in the pseudo multiplexer may be different from each other, and/or a number of the MUX control lines and a number of the pseudo MUX control lines may be different from each other.

Meanwhile, in the above-described exemplary embodiment of the present disclosure, the liquid crystal display device equipped with the multiplexer and the pseudo multiplexer is described as an example.

However, the embodiment of the present disclosure can be applied to all types of display devices equipped with the multiplexer and the pseudo multiplexer, including the liquid crystal displays. For example, the embodiments of the present disclosure can be applied to a light emitting display device using an organic light emitting diode containing an organic material or an inorganic light emitting diode containing an inorganic material, quantum dot display device, a LED display device, mini-LED display device, electrophoresis display device, etc.

As described above, according to the exemplary embodiment of the present disclosure, the multiplexer and the pseudo multiplexer can be placed on opposite sides of the region where the MUX control line and the pseudo MUX control line are arranged, and at this time, the MUX control line can be placed near the multiplexer and the pseudo MUX control line can be placed near the pseudo multiplexer.

Accordingly, the signal transmission path of the MUX control line connected to the multiplexer and the signal transmission path of the pseudo MUX control line connected to the pseudo multiplexer do not overlap each other, so that the parasitic capacitance between the MUX control line and the pseudo MUX control line can be reduced or minimized (or prevented).

Accordingly, the RC delay of the control signal of the multiplexer due to the parasitic capacitance can be relieved, and as a result, the control signal of the multiplexer is transmitted normally, and the charging system defect of the multiplexer can be improved.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:

a display panel including an array substrate in which a display region on which pixels and data lines connected to the pixels are arranged, and a non-display region adjacent to the display region are defined;

a multiplexer which is disposed in a first region of the non-display region, and includes K (K is an integer of 2 or more) MUX transistors, wherein source electrodes of the K MUX transistors are commonly connected to one data channel line, and drain electrodes of the K MUX transistors are respectively connected to K data lines;

a pseudo multiplexer which is disposed in a third region of the non-display region, and includes K pseudo MUX transistors that are disposed to correspond to the K MUX transistors, respectively; and K MUX control lines and K pseudo MUX control lines arranged in a second region of the non-display region between the first and third regions of the non-display region, wherein the K MUX control lines are respectively connected to gate electrodes of the K MUX transistors, and the K pseudo MUX control lines are respectively connected to gate electrodes of the K pseudo MUX transistors, wherein the second region of the non-display region includes a first partial region which is adjacent to the first region of the non-display region and in which the K MUX control lines are arranged, and a second partial area which is adjacent to the third region of the non-display region and in which the K pseudo MUX control lines are arranged.

2. The display device of claim 1, wherein the gate electrode of the MUX transistor contacts the corresponding MUX control line, and extends in a direction toward the first region of the non-display region.

3. The display device of claim 1, wherein the gate electrode of the pseudo MUX transistor contacts the corresponding pseudo MUX control line, and extends toward the third region of the non-display region.

4. The display device of claim 1, wherein the MUX transistor and the pseudo MUX transistor corresponding to each other are arranged to face each other with the second region of the non-display region therebetween.

5. The display device of claim 1, wherein a MUX control signal and a pseudo MUX control signal applied to the MUX control line and the pseudo MUX control line, respectively, which are connected to the MUX transistor and the pseudo MUX transistor corresponding to each other, respectively, have phases opposite to each other.

6. The display device of claim 1, wherein a source electrode and a drain electrode of the pseudo MUX transistor are short circuited.

7. The display device of claim 6, wherein the source electrode and the drain electrode of the pseudo MUX transistor are connected to a voltage line to which a DC voltage of 0V or less is applied.

8. The display device of claim 6, wherein the source electrode and the drain electrode of the pseudo MUX transistor are connected to a voltage line to which a gate low voltage of gate lines in the display panel is applied.

9. The display device of claim 1, wherein the display panel is a liquid crystal display panel, or a light emitting display panel including a light emitting diode.

10. The display device of claim 1, wherein the first region is closer to the display region than the third region.

11. A display device, comprising:

a multiplexer which is in a display panel and is connected between data lines and one data channel line;

a pseudo multiplexer which is in the display panel and is spaced apart from the multiplexer in a first direction in which the data lines extend; and MUX control lines and pseudo MUX control lines between the multiplexer and the pseudo multiplexer, the MUX control lines extending along a second direction crossing the first direction and connected to the multiplexer, the pseudo MUX control lines extending along the second direction and connected to the pseudo multiplexer, wherein the MUX control lines are disposed between the multiplexer and the pseudo MUX control lines.

12. The display device of claim 11, wherein the multiplexer includes K MUX transistors which are respectively connected to K (K is an integer of 2 or more) data lines and are respectively connected to K MUX control lines, and wherein a gate electrode of the MUX transistor contacts the corresponding MUX control line and extends in the first direction.

13. The display device of claim 12, wherein the gate electrode of the MUX transistor does not overlap the pseudo MUX control lines.

14. The display device of claim 11, wherein the pseudo multiplexer includes K pseudo MUX transistors respectively connected to K pseudo MUX control lines, and wherein a gate electrode of the pseudo MUX transistor contacts the corresponding pseudo MUX control line and extends in the first direction.

15. The display device of claim 14, wherein the gate electrode of the pseudo MUX transistor does not overlap the MUX control lines.

16. The display device of claim 11, wherein a MUX control signal and a pseudo MUX control signal which are applied to the MUX control line and the pseudo MUX control line, respectively, corresponding to each other have phases opposite to each other.

17. The display device of claim 11, wherein input terminal and output terminal of the pseudo multiplexer are short circuited.

18. The display device of claim 17, wherein the input terminal and output terminal of the pseudo multiplexer are connected to a voltage line to which a DC voltage of 0V or less is applied.

19. The display device of claim 11, wherein the display panel is a liquid crystal display panel, or a light emitting display panel including a light emitting diode.

20. The display device of claim 11, wherein the pseudo multiplexer is located closer to the outside of the display panel than the multiplexer.

* * * * *